Nov. 24, 1936.  C. SAURER  2,061,985
AXLE CONSTRUCTION
Original Filed Jan. 7, 1933

Inventor
Curt Saurer
Ely + Barrow
Attorneys

Patented Nov. 24, 1936

2,061,985

UNITED STATES PATENT OFFICE 2,061,985

AXLE CONSTRUCTION

Curt Saurer, Akron, Ohio, assignor to The Firestone Tire & Rubber Company, Akron, Ohio, a corporation of Ohio Original application January 7, 1933, Serial No. 650,694. Divided and this application June 19, 1933, Serial No. 676,511

2 Claims. (Cl. 287—85)

This invention relates to axle constructions, and more especially it relates to driving axle constructions comprising torque-rods, and to improved torque-rod construction.

The invention is especially useful on heavy trucks such as are used in construction work where tilting of the axle to extreme angles frequently occurs. The invention is applicable to all types of worm and bevel-gear drives, and is shown herein in its application to a double worm driving unit of a six-wheel vehicle.

The chief objects of the invention are to provide an improved axle construction which will not impose excessive strains on the torque-rods upon tilting of the axle relative to the vehicle body; and to provide a torque-rod structure capable of absorbing torsional strains upon its structure. More specifically the invention aims to provide an improved torque-rod adapted for universal movement with relation to the members to which its respective ends are connected. A further object is to devise an improved joint structure capable of universal angular, orbital, radial or lateral and axial movement for absorbing strains upon a torque-rod structure. This application is a division of my copending application Serial No. 650,694, filed January 7, 1933.

Figure 1:
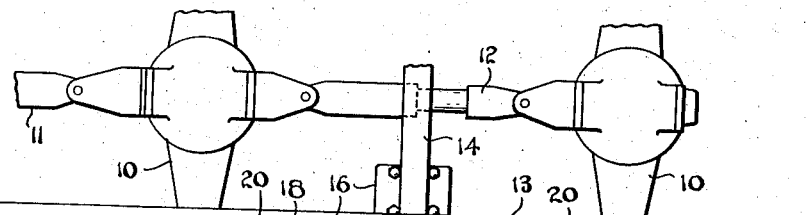
Figure 1 is a plan view of a portion of an axle embodying the invention in its preferred form.
Figure 2:
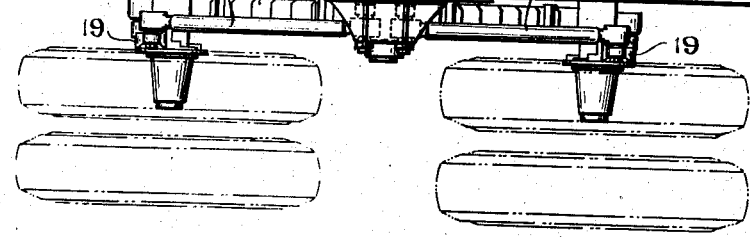
Figure 2 is a side elevation thereof.

Referring to the drawing 10, 10 are a pair of driving units or axles such as are used at the rear end of a six-wheel vehicle, 11 is a drive shaft for one of the axles, and 12 is an inter-axle connection by means of which the other axle is driven. A portion of the vehicle frame consisting of a side-rail 13 and crossbeam 14 is shown. Below the crossbeam 14 is a cross-tube 15, Figure 2, that is connected to the frame by suitable brackets, such as the bracket 16, and said cross-tube carries a spring bracket 17 upon which is mounted a spring structure 18 that is connected at its ends to the respective axles 10. The axles 10 carry brackets 19 adjacent their respective ends, and each of said brackets is formed with an upwardly extending arm and a downwardly extending arm. To the free end of each of said bracket arms is connected one end of a torque-arm 20, the other ends of the torque-rods that are connected to the downwardly extending arms, on one side of the vehicle, being connected to the spring bracket 17, and the other ends of the torque-rods that are connected to the upwardly extending bracket arms being connected to a bracket 21 mounted upon the side-rail 13, above the spring bracket 17. The arrangement is such that the torque-rods of each pair that are connected to each bracket 19 are substantially parallel to each other.

Figures 3, 4:
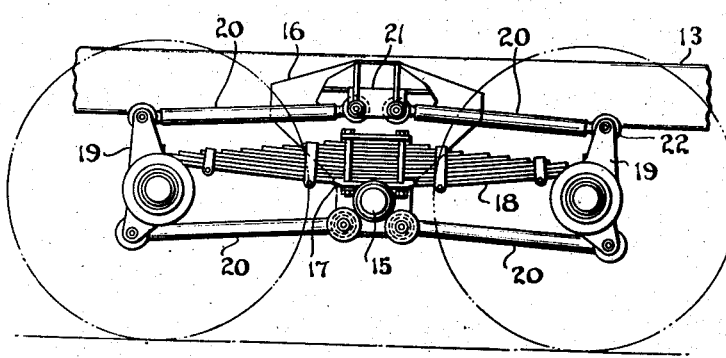
Figure 3 is a detail of one end of an improved torque-rod, a part thereof being in section.
Figure 4 is an elevation of one of the elements included in the end-structure of the torque-rod, before its assembly therewith.

As is clearly shown in Figure 3, each end of each torque-rod 20 carries a terminal member 22 that is fixed in the rod as by threading it thereinto and securing it therein by a pin 23. The member 22 is formed with a bore 24 having its axis transverse to the axis of the rod, said terminal member constituting the socket portion of a ball and socket joint of which 25 is the ball element thereof. Said ball element 25 has the general shape of an ellipsoid, and has one of its ends flattened and its opposite end portion extended to form a spindle 26 which may be connected to a bracket 17 or 21 or to an arm of a bracket 19. The end portion of the spindle 26 is threaded to receive a retaining nut 27.

The ball member 25 is disposed co-axially with relation to the bore 24, the latter being shaped concentrically with relation to the ball member 25 and spaced from it, the space between the bore and ball member being occupied by a cushion of compressed resilient material such as vulcanized rubber. Said rubber cushion is locally vulcanized to the ball 25 and engages the bore 24 with sufficient friction to prevent movement relatively of said bore. The rubber cushion consists of two separate pieces or rings 28, 28, that are vulcanized to the ball 25 concentrically of the long axis thereof, and are spaced from the respective ends of the ball, as is shown in Figure 4. Initially the rubber rings 28 are of larger outside diameter than the bore 24 so that they require to be forced into said bore. To facilitate the assembling of the ball and socket, the bore 24 at one end thereof is counterbored at 29 to receive an annular retainer or insert 30, the bottom of the counterbore being beveled or tapered as at 31 so as not to provide obstruction to the leading ring 28 during assembly. The inner peripheral face of the ring 30 is formed as a continuation of the bore 24.

In assembling the ball and socket joint the ball element shown in Figure 4 is forced into the bore 24 of the socket member 22, spindle end foremost through that end of said member 22 subsequently occupied by ring 30, with the result that the leading rubber ring 28 is compressed, and deformed axially of the ball 25 so as to cover about half the surface thereof. The retainer ring 30 is then forced over the other rubber ring 28 and into its seat in the counterbore 29, thus compressing and deforming the said rubber ring in the same manner as the first-mentioned ring. When the retainer ring 30 is fully seated, the outer marginal portion of the counterbore is peened over the ring 30, as shown at 33, Figure 3, to hold said retaining ring permanently in place.

The construction is such that relative movement of the ball and socket members exerts a tension or increases compression of the rubber cushion 28, there being no relative movement of either member with relation to the surface of the cushion. The ball and socket construction on the respective ends of torque-rods is especially efficacious in that up and down movements and tilting movements of the axles are permitted and torsional movements restrained without imposing severe torsional strains upon the torque-rods. Not only does the ball and socket construction permit substantially universal movement of the axles with relation to the torque-rods, but the rubber cushion between the ball and socket members yieldingly resists said movements, thus supplementing the springs 18 to some extent in cushioning impacts due to uneven roadways. The presence of the rubber cushion also obviates the necessity of lubricating the torque-rod connections, and, since the rubber is highly compressed, no dirt or grit can get into the joint between the cushion and ball or socket member.

Figure 5:
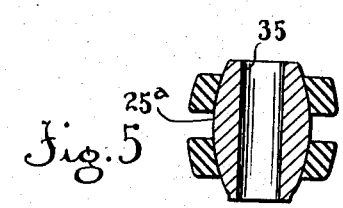
Figure 5 is another embodiment of the element shown in Figure 4.

The embodiment of the ball element of the ball and socket joint, shown in Figure 5, is similar to the embodiment hereinbefore described except that there is no spindle formed thereon. Instead, the ball element 25a is formed with a through bore 35 at its long axis, in which bore a spindle or bolt for connecting the element to another member may be mounted.

The invention reduces upkeep of the axles, obviates the possibility of breakage of torque-rods due to normal operating strains, and achieves the other objects set out in the foregoing statement of objects.

Modification may be resorted to without departing from the spirit of the invention or the scope of the appended claims, which are not limited wholly to the specific construction shown and described.

What is claimed is:

1. A torque-rod comprising a ball and socket joint at the end thereof, said joint including a pair of annular, spaced rubber cushions vulcanized to the ball member and symmetrically disposed on opposite sides of the equator thereof, said cushions normally being in deformed condition and spread axially in the assembled structure, between the ball and socket elements, said socket element comprising a retaining ring that engages a single cushion of the structure.

2. A connecting rod comprising a pair of nested inner and outer joint members, the outer surface of the inner member and the inner surface of the outer member being surfaces of ellipsoids, said surfaces being spaced apart, a pair of annular spaced rubber cushions vulcanized to the inner member, said cushions normally being in deformed condition and spread axially into laterally abutting relation with each other in the assembled structure, between the inner and outer members, said outer member consisting of a pair of annular parts capable of being assembled axially toward each other with each of said parts engaging a single cushion to place said cushions under compression.

CURT SAURER.